United States Patent [19]

Flotow

[11] Patent Number: 5,213,185
[45] Date of Patent: May 25, 1993

[54] CLUTCH ADJUSTMENT STRUCTURE

[75] Inventor: Richard A. Flotow, Butler, Ind.

[73] Assignee: Dana Corporation, Toledo, Ohio

[21] Appl. No.: 815,300

[22] Filed: Dec. 27, 1991

[51] Int. Cl.⁵ .................................................. F16D 13/75
[52] U.S. Cl. .................................. 192/70.25; 192/111 B
[58] Field of Search ............... 192/70.25, 111 B, 70.3, 192/94; 411/437

[56] References Cited

U.S. PATENT DOCUMENTS

| | | | |
|---|---|---|---|
| 1,157,615 | 10/1915 | Carlson | 411/437 |
| 1,172,427 | 2/1916 | Carlson | 411/437 |
| 1,490,967 | 4/1924 | Denneen et al. | |
| 1,571,015 | 1/1926 | Leighton | |
| 1,579,381 | 4/1926 | Miller | 192/94 X |
| 1,631,235 | 6/1927 | Trumble | |
| 1,697,904 | 1/1929 | Coffman et al. | 192/70.25 |
| 1,924,108 | 8/1933 | Conway | |
| 1,988,748 | 1/1935 | Pearmain | |
| 2,026,733 | 1/1936 | Fast | |
| 2,095,816 | 10/1937 | Johansen | |
| 2,102,318 | 12/1937 | Hodgson | |
| 2,241,223 | 5/1941 | Spase et al. | |
| 2,462,944 | 3/1949 | Cardwell et al. | 192/70.25 |
| 2,723,584 | 11/1955 | Parker | 411/437 |
| 2,946,419 | 7/1960 | Ryba | |
| 3,001,619 | 9/1961 | Imperi | |
| 4,466,524 | 8/1984 | Lane | 192/70.25 |
| 4,720,002 | 1/1988 | Kitano et al. | 192/70.25 |
| 4,941,557 | 7/1990 | Flotow et al. | 192/70.25 |

FOREIGN PATENT DOCUMENTS 536147 1/1959 Belgium .............................. 411/437

Primary Examiner—Richard M. Lorence
Attorney, Agent, or Firm—Dykema Gossett

[57] ABSTRACT

A clutch has an adjusting ring defining an operative position for a spring which is movable to force a drive disc into a driven disc. The adjusting ring is threadably adjustable within the interior of a flywheel housing to allow adjustment of the position of the adjusting ring spring to accommodate wear on the discs. The flywheel housing has a plurality of spaced gaps where there are no threads. The gaps accommodate debris and ensure that the threads on the adjusting ring and the flywheel housing do not bind, and prevent adjustment. The threads are of the buttress-type, having a cross-sectional shape that is less likely to bind. Finally, the lead of the thread is increased such that there are a relatively small number of thread turns per unit length. The resulting adjusting ring remains easily adjustable, and less likely to bind than prior art structures.

17 Claims, 2 Drawing Sheets

CLUTCH ADJUSTMENT STRUCTURE

BACKGROUND OF THE INVENTION

This invention relates to improved structure for adjusting the position of clutch members to compensate for wear.

Clutches are known wherein leaves selectively force drive and driven discs into contact to transmit drive from a flywheel to a driven shaft. A flywheel housing rotates with the flywheel, and an adjusting ring attached to the flywheel housing provides an abutment face to properly position the levers relative to the other members of the clutch. The adjusting ring is threadably adjustable relative to the flywheel housing to vary the position of the levers, and compensate for wear on the drive and driven discs. The prior art has typically used adjustment threads which extend continuously around the entire inner peripheral surface of the flywheel housing, and the entire outer peripheral surface of the adjusting ring. Further, the prior art threads have typically had a relatively small lead such that there has been a relatively great number of thread turns per unit of axial length. As an example, in one prior art clutch there are eleven thread turns per inch of length. Also, the prior art has typically used standard bolt threads which have a cross-section with a sharp extending portion at one lateral end of the thread.

The adjustment threads used with such a prior art clutch have several drawbacks. The adjustment threads are typically exposed to impurities, debris and moisture such that the thread surfaces between the adjusting ring and the flywheel housing may bind or rust. As the adjusting ring is adjusted, debris which may be on the continuous adjustment threads is trapped and can become embedded into spaces between the adjustment threads on the adjusting ring and the flywheel housing. Further, with the prior art adjustment threads it is difficult to maintain a sufficient amount of lubricant between the adjustment threads on the flywheel housing and the adjusting ring. A leading edge of the sharp extending portion of the prior art thread will sometimes scrape away the lubricant as the adjusting ring turns relative to the flywheel housing. The lack of lubricant may allow the members to rust. Eventually, the adjusting ring and the flywheel housing may lock up and no longer be adjustable.

There are known clutches having channels cut into the adjusting ring which form gaps in the adjustment thread. The channels are formed to allow passage of various clutch members, and are relatively deep. Due to their depth, the channels may capture and remove too much lubricant, and result in the adjustment threads on the adjusting ring and flywheel housing having insufficient lubricant, and rusting.

SUMMARY OF THE INVENTION

In a disclosed embodiment of the present invention, the adjustment thread on one of the flywheel housing and adjusting ring has gaps which alternate with thread portions, wherein the gaps accommodate debris between the thread portions. The gaps are defined at a surface which is spaced from the opposed adjustment thread by a distance that is less than the height of the adjustment thread. Thus, the gaps provide a small clearance to accommodate debris, but do not remove a large quantity of lubricant.

Further, the threads are preferably of the "buttress-type", wherein an outer surface of the thread is generally parallel to the axis of the flywheel housing and adjusting ring. The leading edge of a buttress thread is less likely to scrape away lubricant as it moves than a standard bolt thread. Further, the thread shape provides clearance to accommodate some debris. Finally, the thread has a relatively great lead such that there is a small number of thread turns per unit of axial length. With the inventive threads, it is relatively easy to maintain a sufficient quantity of lubricant between the adjustment threads on the flywheel housing and the adjusting ring. Further, the large lead and the gaps reduce the contact surface area between the adjustment threads, thus reducing the amount of required lubricant.

These and other features of the present invention can be best understood from the following specification and drawings, of which the following is a brief description.

DETAILED DESCRIPTION OF A PREFERRED EMBODIMENT

Figure 1:
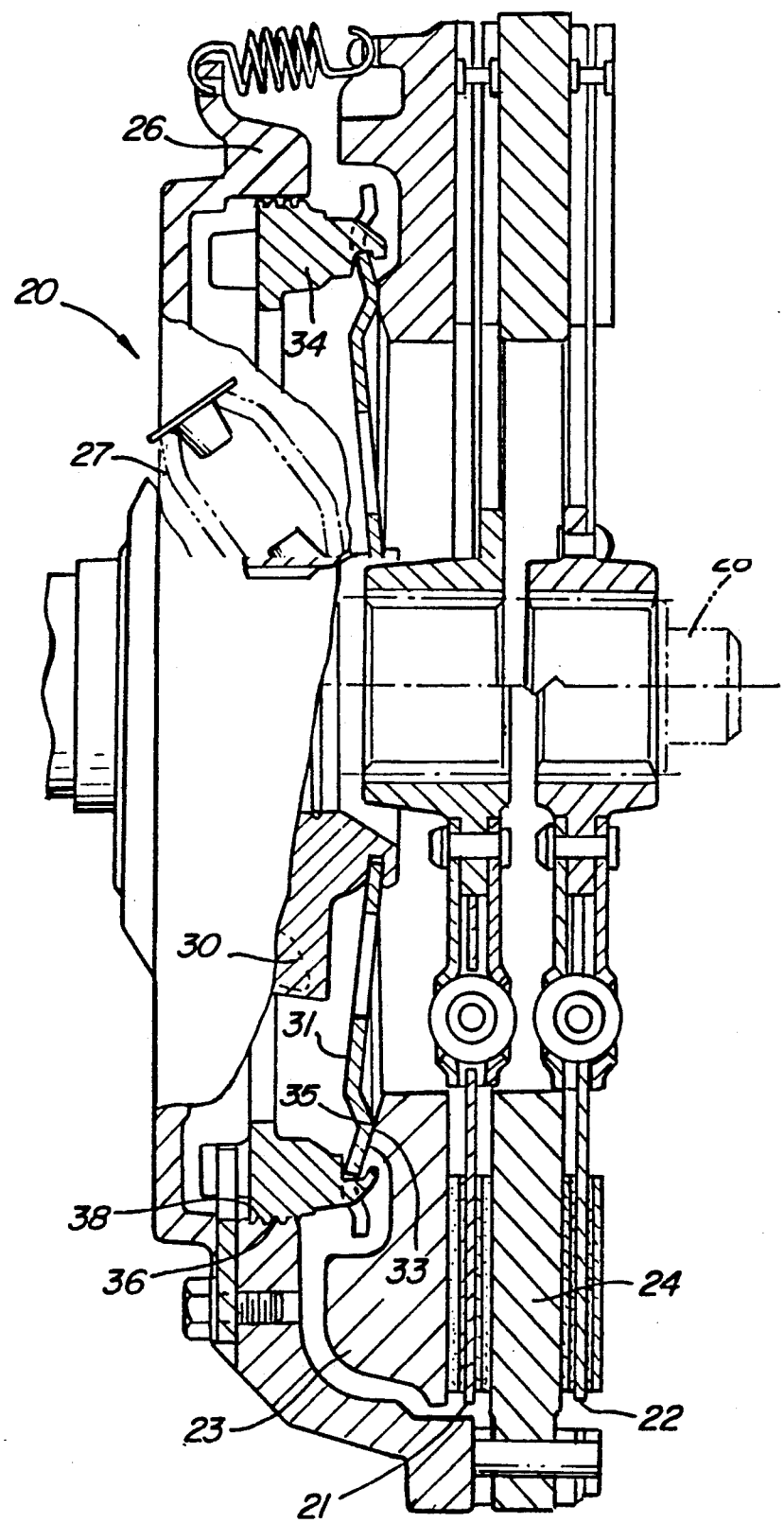
FIG. 1 is a cross-sectional view through a clutch embodying the present invention.

A clutch 20 is shown in FIG. 1 having a pair of spaced driven discs 21 and 22 which are selectively engaged with a pressure plate 23 and an intermediate plate 24 to transmit drive between a flywheel housing 26, which rotates with a flywheel, and a driven shaft 28. A spring retainer 30 is selectively moved to change the position of a plurality of levers 31 to bias the pressure plate 23 and intermediate plate 24 into the driven discs 21 and 22.

An adjusting ring 34 is attached to flywheel housing 26 and provides an abutment surface 32 for levers 31. Lever 31 has an end surface 33 which abuts a surface 35 of pressure plate 23. As is known, spring retainer 30 is selectively moved to the right, as shown in this figure to pivot levers 31, to selectively force pressure plate 23 into a first driven disc 21, to transmit rotation to shaft 28. Springs 27 bias spring retainer 30 to the left as shown in this figure. An actuator moves spring retainer 30 against the force of springs 27 to actuate the clutch.

The amount of force delivered from levers 31 to discs 21, 22, 23 and 24 is dependent upon the axial position of adjusting ring 34 and abutment surface 32. As discs 21-24 wear, adjusting ring 34 is adjusted to the right as shown in FIG. 1 to accommodate the wear. To this end, adjusting ring 34 has threads 36 at an outer peripheral surface which are adjustable on threads 38 at an inner peripheral surface of flywheel housing 26.

This invention is directed to the structure of threads 36 and 38. Threads 36 and 38 are of the type known as buttress threads, and have a flat outermost surface which is generally parallel to the axis of the base of the thread. Further, the threads have a relatively great lead such that there is a relatively small number of thread turns per unit of axial length. Gaps 44 are formed between portions of thread 38. The gaps 44 will be explained in detail below.

Figure 2:
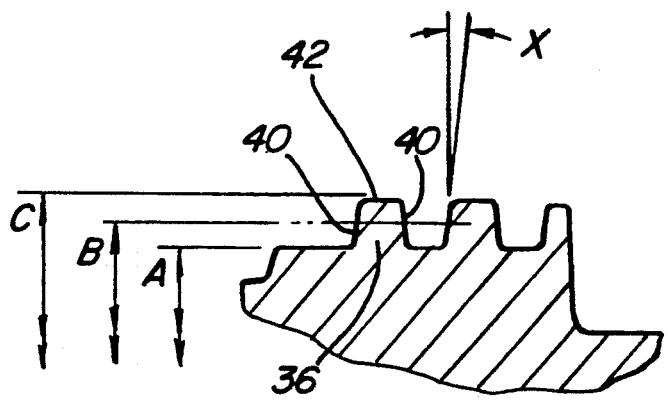
FIG. 2 is an enlarged cross-sectional view through a thread utilized in the present invention.

As shown in FIG. 2, threads 36 have generally parallel sides 40 leading from a root A to an end surface 42. There is a slight gradual curve from point B on side surface 40 leading to end surface 42 at point C. An angle X of approximately 5° is tangent to the curve at point B. Thread 36 is shaped such that end surface 42 is generally parallel to an axis for adjusting ring 34. Thread 38 is of a shape similar to thread 36. Mating threads 36 and 38 have a clearance due to the gradual curve between points B and C which accommodates some debris, preventing seizure.

Due to the unique shape of threads 36 and 38, and the clearances, it is less likely that debris will become embedded between the threads. This reduces the likelihood that adjusting ring 34 will lock relative to flywheel housing 26. Further, due to the unique shape of the threads 36 and 38, it is easier to maintain a sufficient quantity of lubricant between the threads, thus reducing the likelihood that threads 36 and 38 will rust and bind.

Figure 3:
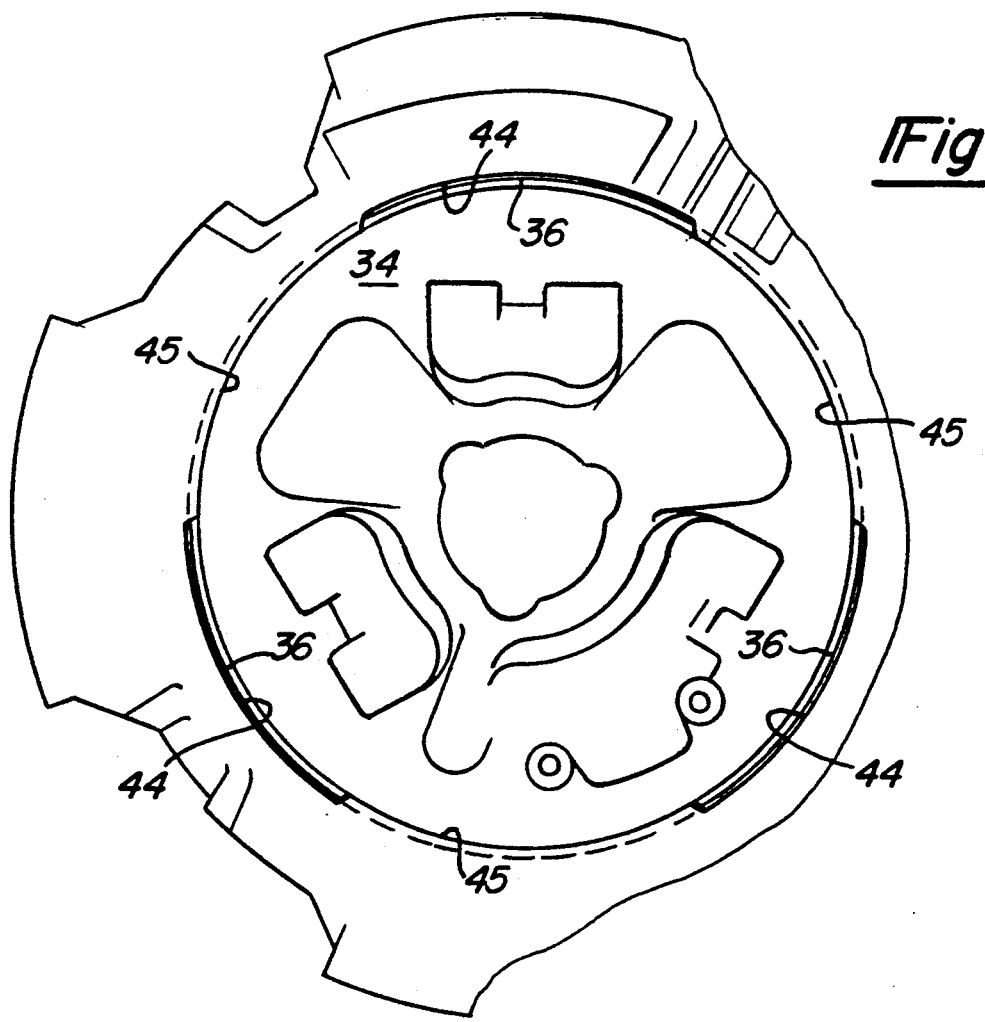
FIG. 3 is a cross-sectional view along through a portion of the present invention.

A further feature of the present invention is best shown in FIG. 3. Flywheel housing 26 has three gaps 44 at an inner peripheral surface between three spaced threaded portions 45. The gaps each extend circumferentially for more than 30 degrees. Preferably, the gaps each extend over approximately 60 degrees of the inner periphery of the flywheel housing 26 and threaded portions 45 also extend over approximately 60 degrees. The combined threaded portions 45 form thread 38. Gaps 44 extend over the entire axial length of thread 38, and provide a space for accommodating debris as adjusting ring 34 moves relative to flywheel housing 26.

Gaps 44 do not extend into the inner peripheral surface of flywheel housing 26. Rather, gaps 44 define an inner peripheral surface portion of flywheel housing 26 which is spaced from an axis of flywheel housing 26 by an amount equal to the root A of threads 38. Thus, although there is a radial clearance provided by gaps 44, it is a relatively small clearance. The inner peripheral surface of flywheel housing 26 at gap 44 is spaced from an end portion of thread 36 by an amount which is less than the height of thread 36. The thread 36 on adjusting ring 34 extends over the entire outer peripheral surface of adjusting ring 34, such there will be no misalignment or binding as could possibly occur should there also be gaps formed in adjusting ring 34.

Adjusting ring 34 may typically have a relatively large diameter, and thus it could become difficult to turn if there is any resistance to adjustment on flywheel housing 26. The combination of gaps 44, the use of buttress threads 36 and 38, and the increase in the lead of the thread all combine to ensure that adjusting ring 34 remains relatively easily adjustable on flywheel housing 26.

There are preferably less than five thread turns per inch of length. In one embodiment of the present invention, there were two thread turns per inch of length. In the embodiment, adjusting ring 34 had an outer diameter to end surface 42 of 11½ inches. The distance between the root of the thread A to point B was 0.125 inch, the distance between point B and point C measured perpendicular to the axis of the thread was 0.125 inch.

In forming threads 36 and 38 a boss is initially cast with adjusting ring 34 and flywheel housing 26, at the location where the threads are to be formed. The threads 36 and 38 are then preferably cut into the boss. It is preferred that thread 38 is initially formed extending about 360° along the inner peripheral surface of flywheel housing 26. Gaps 44 are then machined out of the thread 38.

A preferred embodiment of the present invention has been disclosed, however, a worker of ordinary skill in the art would recognize that certain modifications would come within the scope of this invention. For that reason the following claims should be studied in order to determine the true scope and content of this invention.

I claim:

1. A clutch comprising:
   a first disc adapted to be fixed for rotation with a shaft;
   a housing adapted to be fixed to a source of rotational drive, and a pressure plate fixed for rotation with said housing;
   bias means to selectively cause said pressure plate to contact said first disc and transmit rotation from said housing to said shaft, said bias means selectively urging said pressure plate into contact with said first disc;
   an adjusting ring providing an abutment surface for said bias means, said adjusting ring having an adjusting thread at an outer peripheral surface, and said housing having a housing thread at an inner peripheral surface, said adjusting thread mating with said housing thread such that said adjusting ring is threadably adjustable on said housing to adjust the location of said abutment surface relative to said housing, said housing thread being centered on an axis, and extending from a housing thread root radially inwardly towards said adjusting thread, said housing thread root being spaced from said axis by a first radial distance, there being a plurality of gaps on said inner peripheral surface of said housing, with said housing thread being formed of a plurality of threaded portions which alternate with said gaps, said gaps being formed by an inner peripheral surface portion of said housing spaced from said axis by a second distance which is approximately equal to said first distance; and
   said adjusting thread extending radially outwardly from an adjusting thread root spaced from said axis by a third distance, said adjusting thread extending to a radially outermost end surface spaced from said axis by a fourth distance, the thread height of said adjusting thread being the difference between said fourth and third distances, and said thread height being greater than the distance between said second and fourth distances.

2. A clutch as recited in claim 1, wherein said gaps extend for a circumferential extent that is greater than 30 degrees.

3. A clutch as recited in claim 1, wherein said adjusting thread extends through 360 degrees at said outer peripheral surface of said adjusting ring.

4. A clutch as recited in claim 1, wherein said inner peripheral surface of said housing has three circumferentially spaced threaded portions each extending for approximately 60 degrees, and which are separated by three of said gaps each extending for approximately 60 degrees.

5. A clutch as recited in claim 1, wherein said adjusting thread and said housing thread each have a cross-sectional shape that includes a pair of side surfaces generally perpendicular to said axis, and a top surface generally parallel to said axis.

6. A clutch as recited in claim 1, wherein said gaps extending axially through the entirety of said housing thread.

7. A clutch as recited in claim 1, wherein said adjusting and housing threads each comprise less than five thread turns per inch of axial length.

8. A clutch as recited in claim 7, wherein said adjusting and housing threads each comprise two thread turns per inch of axial length.

9. A clutch comprising:
  a first disc adapted to be fixed for rotation with a shaft;
  a housing adapted to be fixed to a source of rotational drive, and a pressure plate fixed for rotation with said housing;
  bias means to selectively cause said pressure plate to contact said first disc and transmit rotation from said housing to said shaft; and
  an adjusting ring providing an abutment surface for said bias means, said adjusting ring having an adjusting thread at a peripheral surface, and said housing having a housing thread at a peripheral surface, said adjusting thread mating with said housing thread such that said adjusting ring is threadably adjustable on said housing to adjust the location of said abutment surface relative to said first disc and said pressure plate, one of said housing thread and said adjusting thread having a plurality of gaps alternating with a plurality of threaded portions, said gaps being formed by peripheral surface portions of said one of said housing and said adjusting ring, the other of said adjusting thread and said housing thread extending from a root to an end surface, the distance between said end surface and said root being defined as a thread height, said end surface being spaced from said peripheral surface portions by a distance that is less than said thread height.

10. A clutch as recited in claim 9, wherein each of said adjusting and housing threads comprise less than five thread turns per inch of axial length.

11. A clutch as recited in claim 10, wherein each of said adjusting and housing threads comprise there are two thread turns per inch of axial length.

12. A clutch as recited in claim 9, wherein said adjusting ring peripheral surface is an outer peripheral surface, and said housing peripheral surface is an inner peripheral surface.

13. A clutch as recited in claim 9, wherein said gaps are formed in said peripheral surface of said housing.

14. A clutch element comprising:
  a body having a thread at a peripheral surface, said thread having a plurality of gaps alternating with a plurality of threaded portions, said body being centered on a central axis, and said thread extending from said body at a root, said root being spaced from said axis by a first radial distance, said gaps being formed of peripheral surface portions of said body spaced from said axis by a second distance which is approximately equal to said first distance, and wherein said gaps extending for a circumferential extent greater than 30 degrees.

15. An element as recited in claim 14, wherein said body is a housing adapted to be fixed to a source of rotation, and said thread extends from an inner peripheral surface of said housing.

16. An element as recited in claim 13, wherein said gaps each extend for 60 degrees.

17. An element as recited in claim 14, wherein there are three of said gaps each extending for approximately 60 degrees, and there being three spaced threaded portions each extending for approximately 60 degrees between said gaps.

* * * * *